US008747769B2

(12) United States Patent
Del-Gallo et al.

(10) Patent No.: US 8,747,769 B2
(45) Date of Patent: Jun. 10, 2014

(54) CATALYTIC REACTOR INCLUDING A CELL-LIKE STRUCTURE AND ELEMENTS OPTIMIZING THE CONTACT THEREOF WITH THE INNER WALL OF THE REACTOR

(75) Inventors: Pascal Del-Gallo, Dourdan (FR); Daniel Gary, Montigny le Bretonneux (FR); Aude Cuni, Frankfurt (DE); Mathieu Cornillac, St. Gilles les Bains (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 13/513,346

(22) PCT Filed: Nov. 24, 2010

(86) PCT No.: PCT/FR2010/052497
§ 371 (c)(1),
(2), (4) Date: Jun. 1, 2012

(87) PCT Pub. No.: WO2011/067503
PCT Pub. Date: Jun. 9, 2011

(65) Prior Publication Data
US 2012/0235096 A1 Sep. 20, 2012

(30) Foreign Application Priority Data

Dec. 1, 2009 (FR) ..................... 09 58552

(51) Int. Cl.
*B01J 7/00* (2006.01)
*C01B 3/40* (2006.01)
(52) U.S. Cl.
USPC ......................... 422/222; 252/373

(58) Field of Classification Search
None
See application file for complete search history.

(56) References Cited

U.S. PATENT DOCUMENTS

| 4,418,045 | A | 11/1983 | Sato et al. |
| 4,911,879 | A | 3/1990 | Heck et al. |
| 6,077,483 | A | 6/2000 | Locker et al. |
| 2001/0036427 | A1* | 11/2001 | Yamada et al. ............... 422/179 |
| 2004/0120871 | A1 | 6/2004 | De Angelis et al. |
| 2006/0263675 | A1* | 11/2006 | Adzic et al. ..................... 429/44 |
| 2008/0051280 | A1* | 2/2008 | Hagemeyer et al. ............ 502/63 |

FOREIGN PATENT DOCUMENTS

| EP | 1 743 694 | 1/2007 |
| FR | 2 490 503 | 3/1982 |
| JP | 58 084038 | 5/1983 |

OTHER PUBLICATIONS

International Search Report for PCT/FR2010/052497, mailed Mar. 11, 2011.

* cited by examiner

*Primary Examiner* — Melvin C Mayes
*Assistant Examiner* — Douglas Call
(74) *Attorney, Agent, or Firm* — Christopher J. Cronin

(57) ABSTRACT

The invention relates to a catalytic reactor including: a reaction chamber; at least one catalytic structure made up of at least one catalytic cell-like architecture having outer dimensions at most 10% smaller than the inner dimensions of the reaction chamber; an annular space between the inner wall of the reaction chamber and the cell-like architectures; and at least one second structure positioned in the annular space, selected from among: a) a fibrous structure, or b) a structure including at least one metal collar clasping at least one portion of the cell-like architectures and supporting metal fins.

4 Claims, 2 Drawing Sheets

CATALYTIC REACTOR INCLUDING A CELL-LIKE STRUCTURE AND ELEMENTS OPTIMIZING THE CONTACT THEREOF WITH THE INNER WALL OF THE REACTOR

CROSS-REFERENCE TO RELATED APPLICATIONS

This application is a §371 of International PCT Application PCT/FR2010/052497, filed Nov. 24, 2010, which claims §119(a) foreign priority to French patent application 0958552, filed Dec. 1, 2009.

BACKGROUND

1. Field of the Invention

One subject of the present invention is a catalytic reactor comprising a catalytic cellular structure, in particular a catalytic ceramic or metallic foam, and elements optimizing the contact with the inner wall of the reactor.

2. Related Art

Foams made of ceramic or even of metal alloy are known to be used as catalyst support in chemical reactions, in particular heterogeneous catalysis reactions. These foams are particularly beneficial for highly exothermic or endothermic reactions (e.g. the exothermic Fischer-Tropsch reaction, the water-gas shift reaction, partial oxidation reaction, methanation reaction, etc.), and/or for catalytic reactors where high space velocities are sought (steam reforming of natural gas, naphtha, LPG, etc.).

The most widespread method used to create ceramic foams with open macroporosity consists of impregnating a polymer foam (usually a polyurethane or a polyester foam), cut to the desired geometry, with a suspension of ceramic particles in an aqueous or organic solvent. The excess suspension is removed from the polymer foam by repeated application of a compression or by centrifugal spinning, so as to leave only a fine layer of suspension on the strands of the polymer. After one or more impregnations of the polymer foam using this method, the foam is dried to remove the solvent while maintaining the mechanical integrity of the deposited layer of ceramic powder. The foam is then heated to a high temperature in two stages. The first stage known as the binder removal stage consists in degrading the polymer and any other organic compounds that might be present in the suspension, through a slow and controlled increase in temperature until the volatile organic compounds have been completely eliminated (typically 500-900° C.). The second stage known as sintering consists in consolidating the residual inorganic structure using a high-temperature heat treatment.

This method of manufacture thus makes it possible to obtain an inorganic foam which is the replica of the initial polymer foam, give or take the shrinkage caused by the sintering. The final porosity achievable through this method covers a range from 30% to 95% for a pore size ranging from 0.2 mm to 5 mm. The final pore size (or open macroporosity) is derived from the macrostructure of the initial organic "template" (polymer foam, generally polyurethane foam). Said macrostructure generally varies from 60 to 5 ppi (ppi stands for pores per inch, the pores measuring from 50 μm to 5 mm).

The foam may also be of a metallic nature with a chemical formulation that allows the architecture to have chemical stability under operating conditions (temperature, pressure, gas composition, etc.). In the context of an application to the steam reforming of natural gas, the metallic cellular architecture will consist of chemical formulations based on NiFeCrAl oxidized at the surface, this surface oxidation making it possible to create a micron-scale layer of alumina that protects the metallic alloy from any corrosion phenomena.

Cellular architectures that are ceramic and/or metallic covered with ceramic are good supports for catalysts in numerous respects:

they have a maximum surface area/volume ($m^2/m^3$) ratio, so as to increase the geometric area for exchange and therefore indirectly increase the catalytic efficiency, they minimize pressure drops along the bed (between the inlet and the outlet of the catalytic reactor), they have heat transfer of improved axial and/or radial efficiency. Axial means along the axis of the catalytic reactor, and radial means from the internal or external wall of the catalytic reactor toward the center of the catalytic bed, they improve the thermomechanical and/or thermochemical stresses withstood by the bed, they improve the fill density of a tube by comparison with a random filling brought about by conventional structures (spheres, pellets, cylinders, barrels, etc.), control of the filling makes it possible to ensure homogeneity of the filling from one tube to another.

Nevertheless, one problem that is faced is the low quality, during operation, of the "physical" contact between the cellular architectures and the inner wall of the reaction chambers. This is a fortiori true for reactors operating at high temperatures, where the expansion of the metal tube will be greater than that of the cellular architecture of ceramic nature in particular. In the case of architecture of metallic cellular nature, the expansion of the two elements (catalytic bed, reaction chamber containing it) may be harmonized more easily.

This poor contact between the cellular architectures and the inner wall of the reaction chambers may pose two difficulties:

the creation of preferential flows at the wall, the reactants then not being in contact with the catalyst, a poor radial heat transfer.

SUMMARY OF THE INVENTION

A solution of the present invention is a catalytic reactor comprising:
a reaction chamber;
at least one catalytic structure constituted of at least one catalytic cellular architecture having external dimensions at most 10% smaller than the internal dimensions of the reaction chamber;
an annular space between the inner wall of the reaction chamber and the cellular architectures;
at least one second structure positioned in the annular space, chosen from:
a) a fibrous structure, or
b) a structure comprising at least one metal collar tightly encircling at least one portion of the cellular architectures and supporting metal fins, or
c) a metallic and/or ceramic powder or mixture of powders.

The fibrous structure may optionally be covered with an active catalytic phase.

The expression "external dimensions" of the cellular architecture is understood to mean:
the length, the width and the height if the architecture has a block shape; or
the outer diameter and the height if the architecture is a cylinder; etc.

The expression "internal dimensions" of the reaction chamber is generally understood to mean the inner diameter and the length since the reaction chamber is generally a tube, but they may be other dimensions if the reaction chamber has a different shape.

If the catalytic structure comprises several cellular architectures, this will then be constituted by the successive stack of cellular architectures.

The second structure will preferably have characteristics close to those of the reaction chamber (composition, thermal expansion coefficient, thermal conductivity, etc.) and flexibility characteristics.

The expression "fibrous structure" is understood to mean a structure of the type of ceramic fibres based on silicocalcareous compounds, silicoaluminous compounds, etc. or a fibrous structure of metallic nature (for example, steel wool, etc.). The constraint regarding the chemical nature (formulation) of the fibrous structure is, with respect to reaction mixtures, a chemical stability of the material(s) constituting it and a chemical inertia. This point is also valid for the structures b) and c).

These three structures a) or/and b) or/and c) have the advantage of being flexible and therefore of being able to adapt to possible dimensional variations of the cellular structure-inner wall of the reactor annular space, due to differential expansions of the reaction chamber and of said structure.

The fins (structure b) also have the role of increasing the heat transfer. The transfer between the inner wall of the reactor, the fin and the catalytic structure takes place mainly by conduction.

The metallic and/or ceramic powder or mixture of powders (structure c)) also have the role of improving the heat transfer. The transfer between the inner wall of the reactor, the fin and the catalytic structure takes place mainly by conduction. The powder or powder mixture has grain sizes of between 1 and 5000 μm.

DETAILED DESCRIPTION OF THE INVENTION

Figure 1:
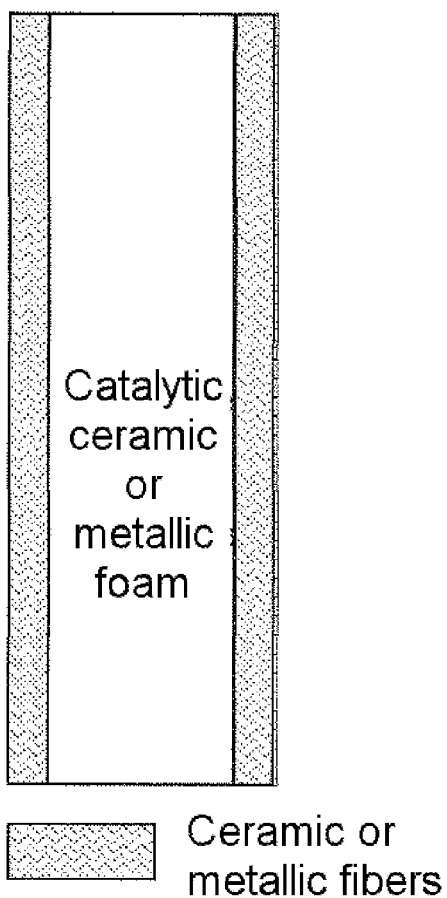
FIG. 1 represents the peripheral of the catalytic ceramic or metallic foams that are stacked successively and are surrounded by a fibrous structure.
Figure 2:
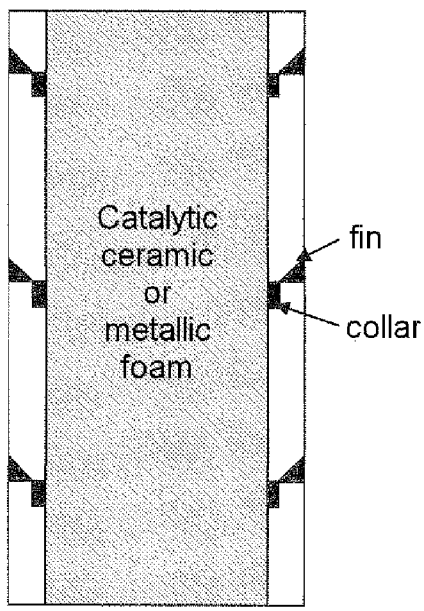
FIG. 2 represents a catalytic ceramic or metallic foam tightly encircled in a structure of "collar or ring with fins" type.
Figure 3:
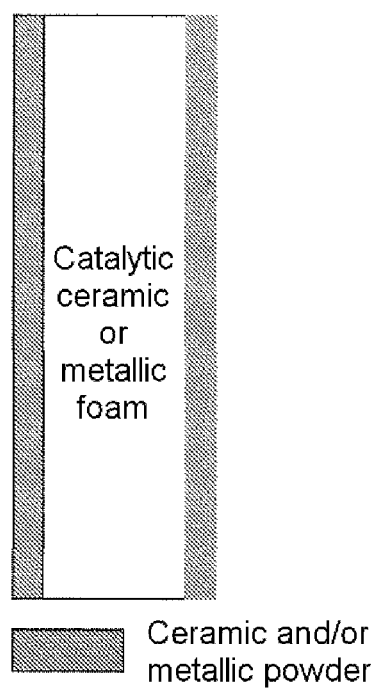
FIG. 3 represents a catalytic ceramic or metallic foam tightly encircled in a structure of bed(s) of ceramic and/or metallic powder(s) type.

In these three figures, the scale is not representative. Specifically, the annular space generally has a size of less than 20 mm, preferably of less than 10 mm.

Depending on the case, the reactor according to the invention may have one or more of the following features:
the cellular architectures are either a ceramic foam, or a metallic foam covered on the surface, for high-temperature applications, i.e. applications above 500° C., with a protective layer of ceramic nature;
the second structure is a fibrous structure made of ceramic (alumina fibers, silicocalcareous fibers, silicoaluminous fibers, etc.) or made of metal; the metallic fibrous structure may be constituted of an alloy comprising nickel and chromium, or any alloy compatible with the conditions of the envisaged reaction, for example alloys of Inconel type;
the ceramic fibrous structure comprises at least one element chosen from (i) the following oxides: alumina, silicoaluminous compounds ($SiO_2$—$Al_2O_3$), silicocalcareous compounds (CaO—$SiO_2$), silico-magnesia compounds (MgO—$SiO_2$), or a combination of these elements, or (ii) the following non-oxides: carbides or nitrides;
the fibrous structure of metallic nature comprises nickel, preferably an alloy based on NiCrO, NiCrAlO or NiFeCrAlO;
the second structure is a structure constituted of at least one collar constituted of an alloy predominantly comprising nickel and chromium and tightly encircling at least one portion of the cellular architectures, and supporting fins constituted of an alloy predominantly comprising nickel and chromium. Prefereably, for the steam reforming application, the metal collar and the fins are made of Inconel;
the second structure is a structure constituted of a metallic and/or ceramic powder or mixture of powders comprising at least 50% of oxides or non-oxide inorganic materials comprising at least one element chosen from (i) the following oxides: alumina, silicoaluminous compounds ($SiO_2$—$Al_2O_3$), silicocalcareous compounds (CaO—$SiO_2$), silico-magnesia compounds (MgO—$SiO_2$), or a combination of these elements, or (ii) the following non-oxides: carbides or nitrides; and/or metallic materials comprising nickel, preferably an alloy based on NiCrO, NiCrAlO or NiFeCrAlO;
the second structure is stable and chemically inert with respect to the gaseous atmospheres present in the reaction chamber.

The catalytic cellular architectures are manufactured from a matrix made of a polymer material chosen from polyurethane (PU), poly(vinyl chloride) (PVC), polystyrene (PS), cellulose and latex but the ideal choice of the foam is limited by strict requirements.

The polymer material must not release toxic compounds; for example, PVC is avoided as it may result in the release of hydrogen chloride.

The catalytic cellular architecture, when it is of ceramic nature, typically comprises inorganic particles, chosen from alumina ($Al_2O_3$) and/or doped alumina (La (1 to 20% by weight)-$Al_2O_3$, Ce (1 to 20% by weight)-$Al_2O_3$, Zr (1 to 20% by weighty $Al_2O_3$), magnesia (MgO), spinel (MgAl$_2$O$_4$), hydrotalcites, CaO, silicocalcareous products, silicoaluminous products, zinc oxide, cordierite, mullite, aluminum titanate and zircon ($ZrSiO_4$); or ceramic particles, chosen from ceria ($CeO_2$), zirconium oxide ($ZrO_2$), stabilized ceria ($Gd_2O_3$ between 3 and 10 mol % in ceria) and stabilized zirconium ($Y_2O_3$ between 3 and 10 mol % in zirconium) and mixed oxides of formula (I):

$$Ce_{(1-x)}Zr_xO_{(2-\delta)} \qquad (I),$$

where $0<x<1$ and $\delta$ ensures the electrical neutrality of the oxide, or doped mixed oxides of formula (II):

$$Ce_{(1-x-y)}Zr_xD_yO_{2-\delta} \qquad (II),$$

where D is chosen from magnesium (Mg), yttrium (Y), strontium (Sr), lanthanum (La), praseodymium (Pr), samarium (Sm), gadolinium (Gd), erbium (Er) or ytterbium (Yb); where $0<x<1$, $0<y<0.5$ and $\delta$ ensures the electrical neutrality of the oxide.

The catalytic reactor according to the invention may be used to produce gaseous products, in particular a syngas.

The feed gas preferably comprises oxygen and/or carbon dioxide and/or steam mixed with methane. However, these catalytic bed structures can be deployed in all catalytic reactors used in the method of producing hydrogen by steam reforming, namely, in particular, pre-reforming beds, reforming beds and water-gas shift beds.

The reaction temperatures that are used are high and are between 200 and 1000° C., preferably between 400 and 1000° C.

The pressure of the reactants ($CO$, $H_2$, $CH_4$, $H_2O$, $CO_2$, etc.) may be between 10 and 50 bar, preferably between 15 and 35 bar.

Another subject of the present invention is the use, within a catalytic reactor comprising a reaction chamber and a catalytic cellular structure:

of a fibrous structure; and/or of a structure comprising at least one metal collar tightly encircling at least one portion of the cellular structure and supporting metal fins in order to prevent the formation of an annular space between the inner wall of the reaction chamber and the catalytic cellular structure; and/or of a metallic and/or ceramic powder or mixture of powders, in order to prevent the formation of an annular space between the inner wall of the reaction chamber and the catalytic cellular structure.

Installing a fibrous structure and/or a structure comprising at least one metal collar, tightly encircling at least one portion of the cellular architectures and supporting metal fins and/or a metallic and/or ceramic powder or mixture of powders, in the annular space between the inner wall of the reaction chamber and the catalytic cellular structure makes it possible both to improve the radial heat transfer and to limit flows along the walls.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A catalytic reactor comprising:
    a reaction chamber;
    at least one catalytic structure comprises at least one catalytic cellular architecture having external dimensions at most 10% smaller than the internal dimensions of the reaction chamber;
    an annular space between the inner wall of the reaction chamber and the cellular architectures;
    at least one second structure positioned in the annular space, chosen from:
        a) a metal fibrous structure made of a nickel alloy based on NiCrO, NiCrAlO or NiFeCrAlO, or
        b) a structure comprising at least one metal collar tightly encircling at least one portion of the cellular architectures and supporting metal fins.

2. The catalytic reactor of claim 1, wherein the catalytic structure comprises a successive stack of at least 2 catalytic cellular architectures each of which has external dimensions that are at most 10% smaller than the internal dimensions of the reaction chamber.

3. The catalytic reactor of claim 1, wherein the cellular architectures are either a ceramic foam, or a metallic foam having a surface covered with a protective ceramic layer.

4. The catalytic reactor of claim 1, wherein:
    the second structure comprises at least one metal collar tightly encircling at least one portion of the cellular architectures and supporting metal fins, said at least one collar made of an alloy predominantly comprising nickel and chromium; and
    said at least one portion of the cellular architectures and supporting fins tightly encircled by said at least one metal collar are made of an alloy predominantly comprising nickel and chromium.

* * * * *